No. 833,158. PATENTED OCT. 16, 1906.
J. DUNSTEDTER.
VEHICLE WHEEL.
APPLICATION FILED NOV. 18, 1905.
2 SHEETS—SHEET 1.
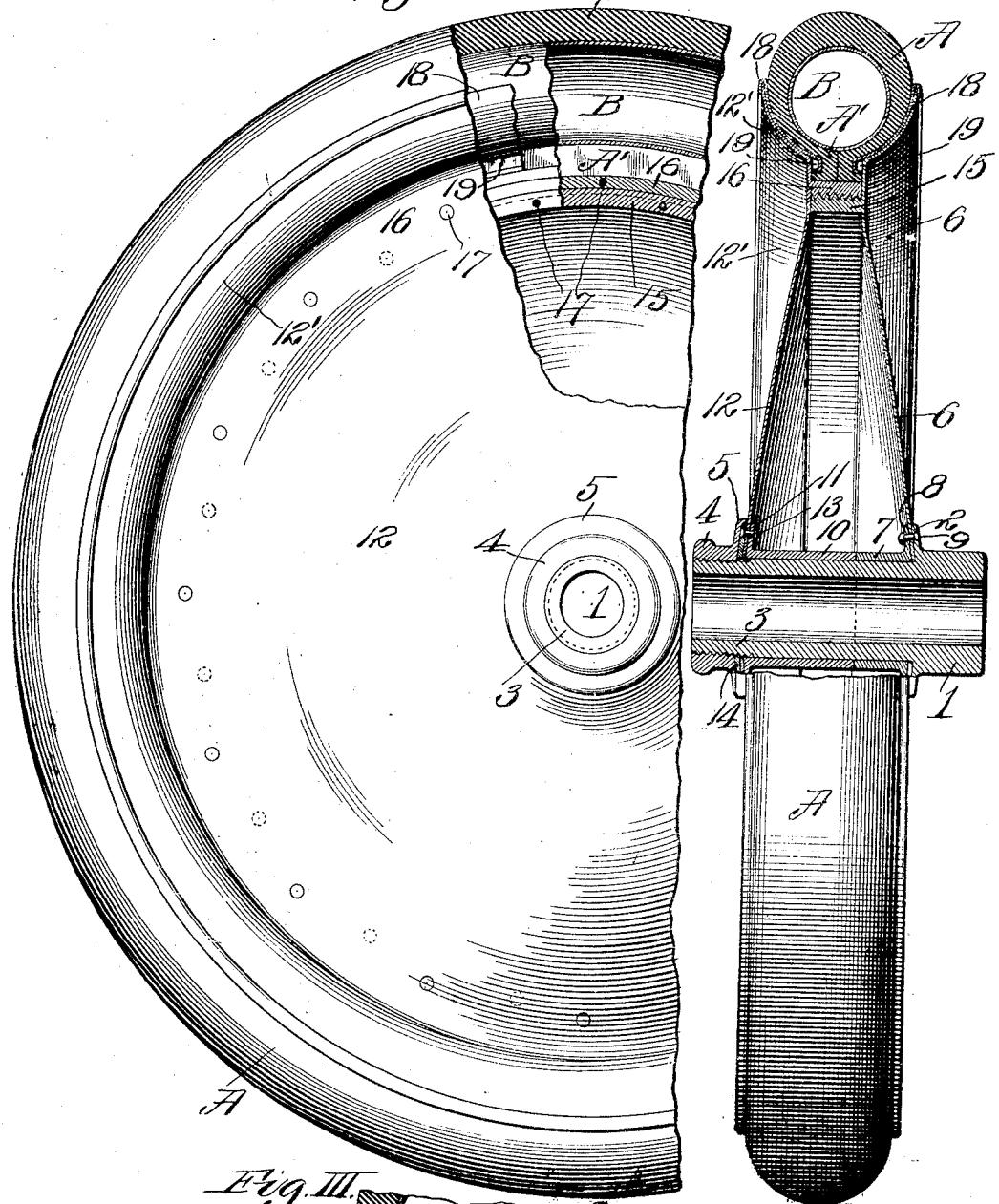
Inventor
Jacob Dunstedter,
by Knight Bros
Attys No. 833,158. PATENTED OCT. 16, 1906.
J. DUNSTEDTER.
VEHICLE WHEEL.
APPLICATION FILED NOV. 18, 1905.
2 SHEETS—SHEET 2.
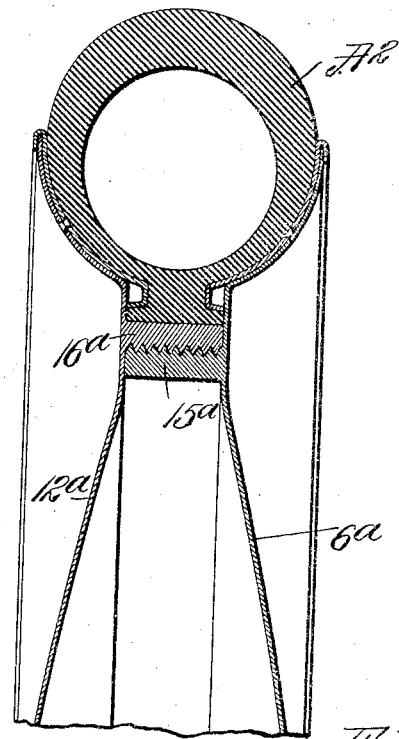
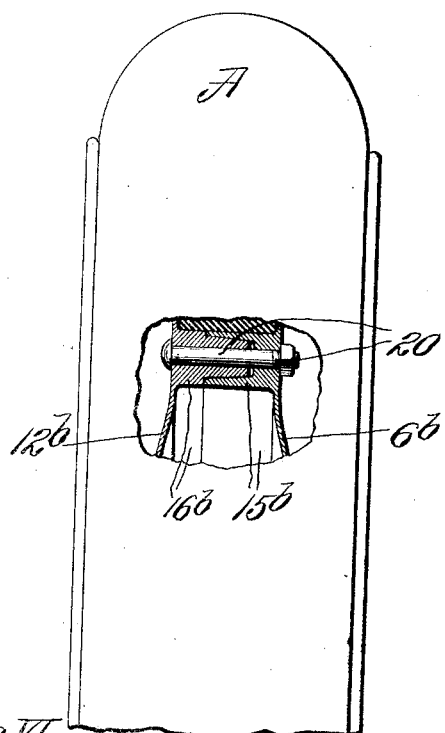
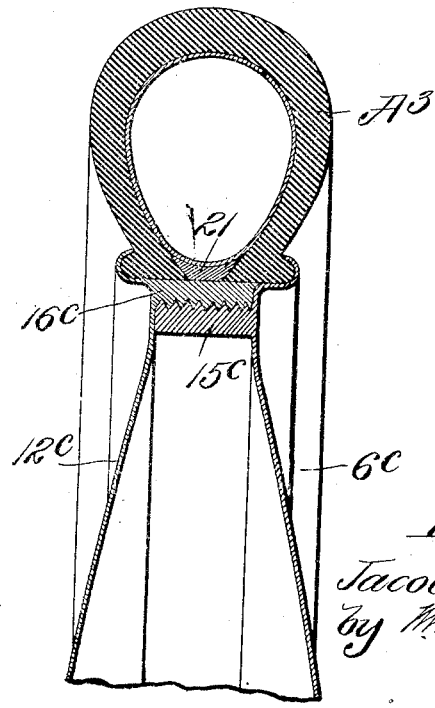
Attest:
Wm. H. Scott
Blanche Hogan
Inventor:
Jacob Dunstedter
by Knight Bros
attys.

UNITED STATES PATENT OFFICE.

JACOB DUNSTEDTER, OF EDWARDSVILLE, ILLINOIS.

VEHICLE-WHEEL.

No. 833,158.             Specification of Letters Patent.            Patented Oct. 16, 1906.

Application filed November 18, 1905. Serial No. 287,961.

*To all whom it may concern:*

Be it known that I, JACOB DUNSTEDTER, a citizen of the United States, residing in Edwardsville, in the county of Madison and State of Illinois, have invented certain new and useful Improvements in Vehicle-Wheels, of which the following is a full, clear, and exact description, reference being had to the accompanying drawings, forming part of this specification.

My invention relates to a vehicle-wheel more particularly intended for use upon motor-vehicles, the object of the invention being to produce a wheel of the character named that will embody a maximum of strength and rigidity, due to a trussing action therein, also a wheel within which the tire may be readily and efficiently clamped to be held in its position without liability of damage thereto, and also a wheel presenting smooth and unbroken exterior faces, thereby permitting of its being readily cleaned, owing to the absence of spaces or crevices within which dirt might lodge.

Figure I is a view, partly in side elevation and partly in vertical section, of a portion of a vehicle-wheel constructed in accordance with my invention. Fig. II is a view partly in cross-section and partly in edge elevation. Fig. III is an enlarged cross-section of the rim portion of my wheel. Fig. IV is a cross-section of a modification of my wheel. Fig. V is a view, partly in edge elevation and partly in cross-section, of another modification. Fig. VI is a cross-section of another modification.

1 designates the hub of my wheel, which is provided near one end with a flange 2 and terminates at its other end in a screw-threaded portion 3. The screw-threaded portion receives a nut 4, preferably of cylindrical form and provided at its inner end with a flange 5, the utility of which will be hereinafter mentioned.

6 designates a trussing dished disk, preferably of steel, that is centrally apertured and which is fitted around the hub 1 near its flange 2 so that it will rest against said flange.

7 is a sleeve surrounding the hub 2 and provided with a flange 8, that bears against the inner face of the trussing-disk 6. This sleeve is secured to the hub-flange 2 by rivets 9, that serve to clamp the flanges 2 and 8 with the trussing-disk between them. The trussing-disk 6 terminates at its outer edge in a flaring rim portion 6′.

10 designates a second sleeve surrounding the hub 2 and opposing the sleeve 7. This sleeve 10 is not secured to the hub and is therefore susceptible of being moved toward the sleeve 7 when the parts of the wheel are being assembled, as will hereinafter appear. The sleeve 10 is provided at its outer end with a flange 11.

12 designates a second trussing dished disk opposing the trussing-disk 6, but spaced apart therefrom by the sleeves 7 and 10. The disk 12 is united to the sleeve 10 by rivets 13, that bind said disk to the flange of said sleeve. The rivets 13 preferably also pass through a reinforcing-ring 14, located at the outer faces of the disk 12 and opposite to the flange of the sleeve 10. The disk 12 is adapted to have inward pressure exerted thereagainst to carry it toward the disk 6 by the nut 4, fitted to the threaded end of the hub 1, whereby said first-named disk may be moved toward the last named and the sleeve 10 also moved toward the sleeve 7 on the wheel-hub. The disk 12 is provided at its outer edge with a flaring rim portion 12′.

15 and 16 designate binding-ring members carried, respectively, by the trussing-disks 6 and 12 in proximity to their rim portions, the member 15 being provided at its perimeter with a screw-thread and the member 16 being provided at its interior face with a screw-thread adapted to be fitted to the thread of the member 15, so that said parts may be united by a screw-thread connection when one of the disks is rotated in securing engagement of said ring members. The binding-ring members 15 and 16 are preferably secured to their respective disks by rivets 17, as seen in Figs. I and III.

A designates a tire, preferably of inflatable character and having an inner tube B. This tire is provided internally with grooved tongues A′, that are adapted to rest upon the outermost binding-ring member 15 or 16, by which the rim portions of the trussing-disks 6 and 12 are held from separation, and the tire occupies a position between the rim portions of said disk that project onto the tire sufficiently to protect the tire from injury when obstructions are encountered by the wheel and also sufficiently to prevent the tire from being forced over the edges of the rim portions to be cut thereby.

18 represents tire-retaining rings which are flanged onto the rim portions of the trussing-disks and extend over the inner faces of said rim portions. Each tire-retaining ring terminates at its inner edge in an annular bead portion 19, which bead portions enter into the grooves in the tongues of the tire A and serve to hold the tire from escape from its position between the trussing-disk rim portions after the trussing-disks are assembled.

In assembling the parts of my wheel the trussing-disk 12 is first fitted to the hub 1 previous to the application of the nut 4, it being understood that the trussing-disk 6 always remains a fixture with respect to said hub. Either or both of the trussing-disks are then turned or rotated to cause the binding-ring members 15 and 16 to move into threaded engagement with each other. The tire A is then introduced between the rim portions of said trussing-disks, after which rotation of the trussing-disks, or one of them, is continued in the proper direction to screw one of the binding-ring members completely onto the other and draw the rim portions of the disks toward each other for the purpose of binding the tire A between them. Trussing action of the trussing-disks is then secured by placing the nut 4 upon the threaded end 3 of the wheel-hub and screwing it home, so that it will exert pressure against the trussing-disk 12, thereby putting it under tension and also drawing the trussing-disk 6 into a condition of tension due to the joining of the disks by the binding-ring members 15 and 16. The parts of the wheel are thereby rendered very rigid in their connections and all play of the trussing-disks is eliminated, due to the disks being united near their rims, one of them being held to the hub, the other being held by the nut 4 under pressure in a direction toward the first named and the sleeves 7 and 10 being located between said disks. It will be understood that previous to the trussing-disk 12 being forced inwardly by the nut 4 the sleeve 10 is separated from the sleeve 7, and when pressure is applied to said disk by said nut the sleeve 10 is forced inwardly, whereby it is caused to abut against the sleeve 7.

In Fig. IV, I have shown a modification illustrating the adaptability of my improvement in connection with a non-inflatable tire A². In this modification the trussing-disks 6ª and 12ª are of the same form as that previously described, and they are united by the binding-ring members 15ª and 16ª.

In Fig. V, I have shown another modification in which the trussing-disks 6ᵇ and 12ᵇ are, instead of being connected by screw-threaded binding-ring members, united by binding-ring members 15ᵇ and 16ᵇ, one of which is provided with a groove, while the other is provided with a tongue that enters said groove, and the members are held assembled by bolts 20 that pass through them.

In Fig. VI, I have shown a modification in which the construction of my wheel is suitable for the reception of the present standard construction of pneumatic tires. In this construction the trussing-disks 6ᶜ and 12ᶜ carry the binding-ring members 15ᶜ and 16ᶜ and are provided with outwardly-projecting rims having inturned lips adapted to engage the tire A³. Between the sides of the tire is a spacing-ring 21, that serves to hold said sides separated while confined by the rims of the trussing-disks.

I claim as my invention—

1. In a vehicle-wheel, the combination of a hub, a pair of trussing-disks fitted to said hub and having flaring tire-receiving rim portions, and binding-ring portions located between said rim portions and the centers of the disks and whereby said disks are connected, and means for placing said disks under tension, substantially as set forth.

2. In a vehicle-wheel, the combination of a hub, a pair of trussing-disks fitted to said hub and having tire-clamping annular rims, interlocking binding-ring members carried by said disks adjacent to their rims, and means for placing said disks under tension, substantially as set forth.

3. In a vehicle-wheel, the combination of a hub, a pair of trussing-disks fitted to said hub and having tire-clamping annular rims, binding-ring members carried by said disks adjacent to their rims, and means for placing said disks under tension; said binding-ring members being screw-threaded and engaging each other, substantially as set forth.

4. In a vehicle-wheel, the combination of a hub, a trussing-disk fixed to said hub, a second trussing-disk loosely fitted to said hub, a sleeve fixed to said second trussing-disk and extending inwardly therefrom toward said first-named disk and adapted to loosely surround said hub, and means for forcing said second trussing-disk toward said first-named disk; said disks being provided with means of connection adjacent to their rim portions, substantially as set forth.

5. In a vehicle-wheel, the combination of a hub, a trussing-disk fixed to said hub, a second trussing-disk loosely fitted to said hub, a sleeve fixed to said second trussing-disk and extending inwardly therefrom toward said first-named disk and adapted to loosely surround said hub, and a nut fitted to said hub and arranged to bear against said second trussing-disk to force it toward said first-named disk; said disks being provided with means of connection adjacent to their rim portions, substantially as set forth.

JACOB DUNSTEDTER.

In presence of—
E. S. KNIGHT,
BLANCHE HOGAN.